Patented May 13, 1952

2,596,090

UNITED STATES PATENT OFFICE 2,596,090

METHOD OF TREATING TOCOPHEROLS

James G. Baxter, Rochester, N. Y., assignor, by mesne assignments, to Eastman Kodak Company, Rochester, N. Y., a corporation of New Jersey No Drawing. Application October 27, 1949, Serial No. 123,990

8 Claims. (Cl. 260—333)

This invention relates to materials having vitamin E activity and is particularly concerned with the treatment of tocopherol material having relatively low vitamin E potency.

The group of related materials having vitamin E activity and called tocopherols are characterized by having a chroman-like heterocyclic ring structure including a benzenoid nucleus. All of the tocopherols have a substituent phenolic hydroxyl group in the 6 position on the benzenoid nucleus. The tocopherols occur naturally, particularly good sources of tocopherol materials being vegetable oils such as wheat germ oil, cottonseed oil, soybean oil, corn oil and the like. Four naturally-occurring tocopherols have been found and designated respectively as alpha-tocopherol, beta-tocopherol, gamma-tocopherol and delta-tocopherol.

Alpha-tocopherol possesses a substantially higher degree of vitamin E biological activity, as measured by bioassay, than the non-alpha tocopherols. The enhanced activity of alpha-tocopherol is evidenced by both the free alpha-tocopherol and the alpha-tocopheryl esters.

The non-alpha tocopherols which possess relatively lower vitamin E potency than alpha-tocopherol are characterized by having at least one aromatic hydrogen atom on the benzenoid nucleus. In the case of the low potency beta-, gamma- and delta-tocopherols, the aromatic hydrogen atoms are ortho to the phenolic hydroxyl group which is present in the 6 position on the tocopherol nucleus. The structures of these non-alpha naturally-occurring tocopherols are as follows:

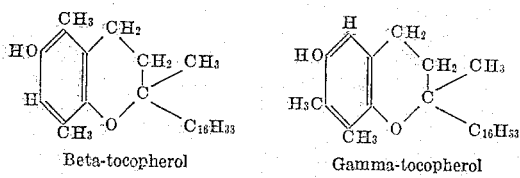

Beta-tocopherol     Gamma-tocopherol

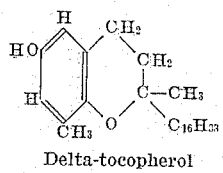

Delta-tocopherol

The relatively low potency tocopherols constitute a substantial proportion of the available supply of tocopherol material. It is therefore desirable to provide means for enhancing the vitamin E biological activity of such non-alpha tocopherol material and thereby increase the supply of highly effective vitamin E-active material.

It is an object of this invention to provide a new and useful method of treating tocopherol material having relatively low vitamin E biological activity.

It is a further object of the invention to provide an improved method of enhancing the vitamin E activity of tocopherol material having at least one aromatic hydrogen atom on the benzenoid nucleus.

Another object of the invention is to provide a new method of preparing biologically active material which is convertible by reduction to material of high vitamin E biological activity.

Another object of the invention is to provide a new method of converting beta-, gamma-, and delta-tocopherols to therapeutically useful derivatives thereof.

Another object of the invention is to provide a new method of effecting substitution on the nucleus of tocopherol material of relatively low vitamin E activity without objectionable polymerization and decomposition of such tocopherol material.

Another object of the invention is to provide an economically feasible method of enhancing the vitamin E biological activity of beta-, gamma- and delta-tocopherols.

Other objects will be apparent from the description and claims which follow.

These and other objects of the invention are attained by reacting tocopherol material having at least one aromatic hydrogen atom on the benzenoid nucleus with formaldehyde and a hydrogen halide and oxidizing the product of such reacting whereby at least one formyl group is introduced on the nucleus of such tocopherol material in a position normally occupied by an aromatic hydrogen atom. The formylated tocopherol material thus obtained is biologically active and useful as a therapeutic agent in the treatment of muscular degenerative diseases such as muscular dystrophy. The substituent formyl groups can thereafter be reduced to methyl groups whereby the vitamin E biological activity of the tocopherol material being treated is substantially enhanced.

The invention is applicable for treating any tocopherol material, whether natural or synthetic, which has at least one aromatic hydrogen atom on the benzenoid nucleus. It is particularly applicable for treating beta-, gamma- and delta-tocopherols which are characterized by having at least one aromatic hydrogen atom on the nucleus ortho to the phenolic hydroxyl group. The relatively low potency tocopherols can be treated singly or in mixtures with one or more other non-alpha tocopherols and/or alpha-tocopherol. In the case of tocopherol compositions containing one or more non-alpha tocopherols in admixture with alpha-tocopherol, the alpha-tocopherol can be separated out prior to treatment of the remainder of the mixture in accordance with this invention, but such separation is not necessary since alpha-tocopherol is not adversely affected by the processes of this invention.

The processes embodying the invention are effective in treating low potency tocopherol material produced synthetically by the condensation of phytol with a methyl-substituted hydroquinone or similar method. In commercial practice, however, the invention is of particular importance in treating tocopherol material obtained from natural sources, particularly vegetable oils. The vegetable oil tocopherols are desirably treated in the form of a concentrate, suitable tocopherol concentrates being obtained from vegtable oils by high vacuum distillation, saponification, solvent extraction, selective adsorption or similar concentrating process or a combination of these and/or other concentrating processes.

In practicing the invention, the low potency tocopherol material is first subjected to formylation by reacting the tocopherol material with formaldehyde and a hydrogen halide and oxidizing the product of such reaction whereby biologically active formyl tocopherol derivatives are formed which are readily reduced to material having enhanced vitamin E biological activity. The enhancement of the vitamin E potency of relatively low potency tocopherol material by formylation and reduction is described in detail in the copending application of Weisler Serial No. 123,986, filed October 27, 1949.

Treatment of low potency tocopherol material in accordance with this invention by reacting such material with formaldehyde and a hydrogen halide results in the introduction on the tocopherol nucleus of at least one halomethyl group by replacement of an aromatic hydrogen atom. Reaction can be effected employing formaldehyde itself or a polymer of formaldehyde such as paraformaldehyde or any other material capable of furnishing formaldehyde to the reaction under reaction conditions. Any of the hydrogen halides can be employed, although hydrogen fluoride is less desirable than hydrogen chloride, hydrogen bromide or hydrogen iodide because of handling difficulties.

The substituent halomethyl groups are thereafter oxidized to formyl groups. Any suitable oxidizing agent capable of oxidizing halomethyl groups to formyl groups without adversely affecting the tocopherol material can be used, but oxidation is desirably effected by means of an organic oxidizing agent, nitroso and hydroxylamine hydrocarbon derivatives being particularly suitable. Suitable oxidizing agents include p-nitroso diethylaniline; benzyloxyamine; N-phenyl N-nitroso benzylamine; p-nitroso dimethylaniline; nitroso benzene; benzyl hydroxylamine; ethyl hydroxylamine; ethoxyamine; methyl hydroxylamine; phenyl hydroxylamine; N-methyl N-nitroso aniline; o-tolyl hydroxylamine; diethyl nitrosamine; n-tolyl hydroxylamine; p-tolyl hydroxylamine; diisopropyl nitrosamine; dimethyl nitrosamine; diphenyl nitrosamine; and dipropyl nitrosamine. Similar oxidation of the halomethyl groups to formyl groups is obtained using other well-known oxidizing agents having oxidation potentials not substantially higher than that of the nitroso compounds as typified by p-nitroso diethylaniline.

Halomethylation and oxidation of beta-tocopherol in accordance with this invention gives 7-formyl beta-tocopherol which is readily reduced to alpha-tocopherol. Halomethylation and oxidation of gamma-tocopherol gives 5-formyl gamma-tocopherol which is likewise reducible to alpha-tocopherol. Treatment of delta-tocopherol usually gives a mixture of formyl derivatives, perdominantly 5-formyl delta-tocopherol and 5,7-diformyl delta-tocopherol. The former derivative upon reduction gives beta-tocopherol while the latter derivative is reduced to alpha-tocopherol.

The formylated tocopherols can be used as therapeutic agents if desired, preferably in esterified form. Both free and formylated tocopherols are readily esterified by known esterification procedures such as by treatment with an acid halide or anhydride. The acyl esters are desirably prepared, of which esters the fatty acid esters and particularly the esters of fatty acids having less than 20 carbon atoms are preferred. Typical esters, prepared by reaction with an acid halide such as palmityl chloride or an anhydride such as acetic anhydride, are the acetates, benzoates, palmitates, oleates, stearates, myristates and the like.

Reduction of the formylated tocopherols, whether free or esterified, is readily effected by means of an active metal, such as zinc, and a mineral acid, such as hydrochloric acid; by the Clemmensen procedure using a zinc-mercury amalgam and a mineral acid; by catalytic hydrogenation at elevated pressures using a metal catalyst such as nickel or palladium; by treatment with a soluble metal hydride such as lithium aluminohydride, lithium borohydride or aluminum hydride followed by hydrolysis and treatment with zinc and mineral acid; or by similar reduction process. The reduction effects conversion of the substituent formyl groups to methyl groups whereby the vitamin E biological activity of the material being treated is substantially enhanced.

The invention is further illustrated by the following detailed examples of certain preferred embodiments thereof.

*Example 1*

One hundred forty grams of a tocopherol composition (87.7% total tocopherols) containing approximately equal proportions of gamma- and delta-tocopherols was dissolved in 1900 cc. of isopropyl ether. To this solution was added 550 cc. of concentrated hydrochloric acid and 100 cc. of formalin (approximately 37% formaldehyde by weight), and the mixture was stirred for 5 hrs. at 35° C. The resulting solution was then cooled with ice, washed with two 50 cc. portions of ice water, and dried under anhydrous sodium sulfate. Sixty grams of p-nitroso diethyl aniline dissolved in 600 cc. of ethanol was added slowly while the solution was being stirred. The green color due to the p-nitroso diethyl aniline changed to brown and solids precipitated from the solution. The mixture was then stirred for 15 minutes, allowed to stand overnight, and the precipitated material filtered from the solution. The precipitate was washed with ether and the washings were added to the original filtrate. The filtrate was washed successively with sulfuric acid and water, and the ether layer was separated out.

Evaporation of the ether gave a residual oil containing mixed formylated tocopherols including 5-formyl gamma-tocopherol, 5-formyl delta-tocopherol and 5,7-diformyl delta-tocopherol. The product concentrate had $$E_{1\,cm.}^{1\%}\,(284\,m\mu) = 134$$

and $$E_{1\,cm.}^{1\%}\,(390\,m\mu) = 60$$

Addition of a portion of the concentrate to 2,4-dinitrophenyl hydrazine gave a red precipitate.

Example 2

The concentrate of mixed formyl tocopherols as prepared in Example 1 was treated to effect reduction of the substituent formyl groups to methyl groups. The concentrate was dissolved in isopropyl ether to which was added zinc-mercury amalgam and concentrated hydrochloric acid in an amount approximately equal to the weight of concentrate being treated. The mixture was stirred at 45° C. for 2.5 hours. The vitamin E concentrate of enhanced potency was recovered by vacuum distillation. Conversion of the low potency tocopherols to alpha-tocopherol was verified by treatment of the distillate with succinic anhydride and pyridine to give the crystalline acid succinate of alpha-tocopherol which after purification had a melting point of 76°–77° C.

Example 3

Fifty grams of a gamma-tocopherol concentrate comprising 43% tocopherol was dissolved in 350 cc. of ether. The resulting solution was then mixed with 50 cc. of concentrated hydrochloric acid and 11 cc. of aqueous formalin. A stream of hydrogen chloride gas was passed through the mixture while it was stirred at room temperature for 65 minutes. Oxidation was effected by means of phenyl hydroxylamine to give a residual concentrate of 5-formyl gamma-tocopherol. Reduction of the 5-formyl gamma-tocopherol was effected by means of zinc dust and hydrochloric acid. When the reaction was complete, zinc chloride was removed by filtration through sodium aluminum silicate to give a concentrate of alpha-tocopherol having more than twice the vitamin E potency of the original gamma-tocopherol.

Example 4

A 0.65 g. sample of beta-tocopherol was dissolved in 25 cc. of ether. The temperature of the solution was maintained at 30° C. while 5 cc. of hydrochloric acid and 0.4 cc. of aqueous 37% formaldehyde solution were added. Hydrogen chloride gas was bubbled through the solution for 25 minutes, after which the solution was cooled with ice and washed with ice water. The resulting 7-chloromethyl beta-tocopherol was oxidized to 7-formyl beta-tocopherol using nitroso benzene as oxidizing agent. The 7-formyl beta-tocopherol was a deep red oil.

Example 5

An effective method of reducing formyl groups to methyl groups is as follows. One gram of a formylated tocopherol derivative, such as the 7-formyl beta-tocopherol prepared in Example 4, is dissolved in 25 ml. of dry ether. Four ml. of an 0.8 N. solution of lithium aluminohydride in ether is added dropwise while the reaction mixture is stirred. The mixture is refluxed for 30 minutes and then hydrolyzed with 1 N. hydrochloric acid. The hydrolysis product is extracted with ether, and the extract is washed, dried and the solvent removed by evaporation under nitrogen to give a concentrate of 7-hydroxy methyl beta-tocopherol. This product is then reduced to alpha-tocopherol using 5 g. of zinc amalgam and 5 cc. of concentrated hydrochloric acid. The conversion of the 7-formyl beta-tocopherol to alpha-tocopherol was verified by preparation of the acid succinate melting at 76°–77° C.

The invention thus provides a simple and effective method of treating relatively low potency tocopherol material to convert such material to biologically active formylated tocopherol material which is convertible by reduction to tocopherol material having substantially enhanced vitamin E biological activity.

While the invention has been described in considerable detail with reference to certain preferred embodiments, it will be understood that variations and modifications can be effected within the spirit and scope of the invention as described hereinabove and as defined in the appended claims.

What I claim is:

1. The method of enhancing the vitamin E biological activity of relatively low potency tocopherol material which comprises reacting tocopherol material having at least one aromatic hydrogen atom on the benzenoid nucleus with formaldehyde and a hydrogen halide, oxidizing the resulting substituent groups introduced on the nucleus of said tocopherol material to formyl groups by reacting the resulting material with an oxidizing agent having an oxidation potential not substantially higher than p-nitroso diethylaniline, and reducing said formyl groups to methyl groups.

2. The method of enhancing the vitamin E biological activity of relatively low potency tocopherol material which comprises reacting a tocopherol compound having at least one aromatic hydrogen atom on the nucleus and being selected from the class consisting of beta-tocopherol, gamma-tocopherol and delta-tocopherol with formaldehyde and a hydrogen halide and thereby introducing at least one substituent halomethyl group on the nucleus of said tocopherol in a position normally occupied by said aromatic hydrogen atom, oxidizing said substituent halomethyl group to a formyl group by reacting the resulting halomethylated tocopherol compound with an oxidizing agent having an oxidation potential not substantially higher than p-nitroso diethyl aniline, and reducing said formyl group to a methyl group.

3. The method of enhancing the vitamine E biological activity of delta-tocopherol which comprises reacting delta-tocopherol characterized by having aromatic hydrogen atoms in the 5 and 7 positions on the nucleus with formaldehyde and a hydrogen halide, and oxidizing the product of said reacting with an oxidizing agent having an oxidation potential not substantially higher than p-nitroso diethylaniline, said reacting and oxidizing combining to replace at least one of said aromatic hydrogen atoms with a formyl group, and reducing said formyl group to a methyl group.

4. The method of enhancing the vitamin E biological activity of gamma-tocopherol which comprises introducing a substituent formyl group into the 5 position on the nucleus of gamma-tocopherol by reacting gamma-tocopherol with formaldehyde and a hydrogen halide and oxidizing the product of said reacting with an oxidizing agent having an oxidation potential not substantially higher than p-nitroso diethylaniline, and thereafter reducing said substituent formyl group to a methyl group.

5. The method of enhancing the vitamin E biological activity of beta-tocopherol which comprises introducing a substituent formyl group into the 7 position on the nucleus of beta-tocopherol by reacting beta-tocopherol with formaldehyde and a hydrogen halide and oxidizing the product of said reacting with an oxidizing agent having an oxidation potential not substantially higher than p-nitroso diethylaniline, and thereafter converting said formyl group to a methyl group by reducing said formyl group.

6. The method of enhancing the vitamin E biological activity of delta-tocopherol which comprises replacing the aromatic hydrogen atoms in the 5 and 7 positions on the nucleus of delta-tocopherol with formyl groups by reacting delta-tocopherol with formaldehyde and a hydrogen halide and oxidizing the product of said reacting with an oxidizing agent having an oxidation potential not substantially higher than p-nitroso diethylaniline, and thereafter reducing said substituent formyl groups to methyl groups.

7. The method of enhancing the vitamin E biological activity of relatively low potency tocopherol material which comprises reacting a tocopherol selected from the class consisting of beta-tocopherol, gamma-tocopherol and delta-tocopherol with formaldehyde and a hydrogen halide, oxidizing the product of said reacting by treating said product in solution in a solvent with an organic nitroso compound, and reducing the product of said oxidizing to tocopherol material having enhanced vitamin E biological activity.

8. The method of enhancing the vitamin E biological activity of relatively low potency tocopherol material which comprises reacting a tocopherol selected from the class consisting of beta-tocopherol, gamma-tocopherol and delta-tocopherol with formaldehyde and a hydrogen halide, oxidizing the product of said reacting by treating said product in solution in a solvent with an organic hydroxylamine, and reducing the product of said oxidizing to tocopherol material having enhanced vitamin E biological activity.

JAMES G. BAXTER.

REFERENCES CITED

The following references are of record in the file of this patent:

UNITED STATES PATENTS

| Number | Name | Date |
|---|---|---|
| 2,486,542 | Weisler et al. | Nov. 1, 1949 |

OTHER REFERENCES

Organic Reactions, vol. 1, pp. 64–65, Wiley, N. Y., 1942.

Whitmore: "Organic Chemistry," pp. 790, Van Nostrand, N. Y., 1937.

Chemical Abstracts 40, 6445 (1946).